United States Patent
Ferhatosmanoglu et al.

(10) Patent No.: US 12,393,634 B1
(45) Date of Patent: Aug. 19, 2025

(54) SCALABLE GRAPH-BASED VECTOR STORAGE AND SEARCH IN DISTRIBUTED STORAGE SYSTEMS

(71) Applicant: Amazon Technologies, Inc., Seattle, WA (US)

(72) Inventors: Hakan Ferhatosmanoglu, Stratford-upon-Avon (GB); Andrew Kutsy, London (GB); Jonathan S. Katz, New York, NY (US); Mrithyunjaya Kumar Annapragada, Concord, MA (US); Marc Brooker, Seattle, WA (US); Andrew Kent Warfield, Vancouver (CA); Yu-Ju Huang, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/759,330

(22) Filed: Jun. 28, 2024

(51) Int. Cl.
    *G06F 16/901* (2019.01)
    *G06F 16/22* (2019.01)

(52) U.S. Cl.
    CPC ...... *G06F 16/9024* (2019.01); *G06F 16/2237* (2019.01)

(58) Field of Classification Search
    CPC .......................... G06F 16/9024; G06F 16/2237
    See application file for complete search history.

(56) References Cited

U.S. PATENT DOCUMENTS

| | | | |
|---|---|---|---|
| 2012/0215864 A1* | 8/2012 | Fukuoka | G06Q 10/10 709/206 |
| 2018/0173699 A1* | 6/2018 | Tacchi | G06F 16/358 |
| 2025/0036515 A1* | 1/2025 | Ocher | G06F 16/273 |

* cited by examiner

*Primary Examiner* — Cam Y T Truong
(74) *Attorney, Agent, or Firm* — Knobbe, Martens, Olson & Bear, LLP

(57) ABSTRACT

Systems and methods are provided for generating an index of a set of vectors as a distributed proximity-based graph data structure comprising representative vectors corresponding to subsets of the set of vectors, storing the set of vectors across a plurality of storage devices of a distributed storage system based on the distributed proximity-based graph data structure, and loading, in response to a vector query, a plurality of subsets of the set of vectors from the distributed storage system based on the distributed proximity-based graph data structure.

16 Claims, 8 Drawing Sheets

SCALABLE GRAPH-BASED VECTOR STORAGE AND SEARCH IN DISTRIBUTED STORAGE SYSTEMS

BACKGROUND

Data centers may provide data storage services configured to store data submitted by computing devices, and enable retrieval of that data over a network. A variety of types of data storage services can be provided, often varying according to their input/output (I/O) mechanisms. For example, database services may allow I/O based on a database query language, such as the Structured Query Language (SQL). Block storage services may allow I/O based on modification to one or more defined-length blocks, in a manner similar to how an operating system interacts with local storage, and may thus facilitate virtualized disk drives usable, for example, to store an operating system of a virtual machine. Object storage services may allow I/O at the level of individual objects or resources, such as individual files, which may vary in content and length. For example, an object storage service may provide an interface compliant with the Representational State Transfer (REST) architectural style, such as by allowing I/O based on calls designating input data and a hypertext transport protocol request method (e.g., GET, PUT, POST, DELETE, etc.) to be applied to that data. By transmitting a call designating input data and a request method, a client can thus retrieve the data from an object storage service, write the data to the object storage service as a new object, modify an existing object, etc.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
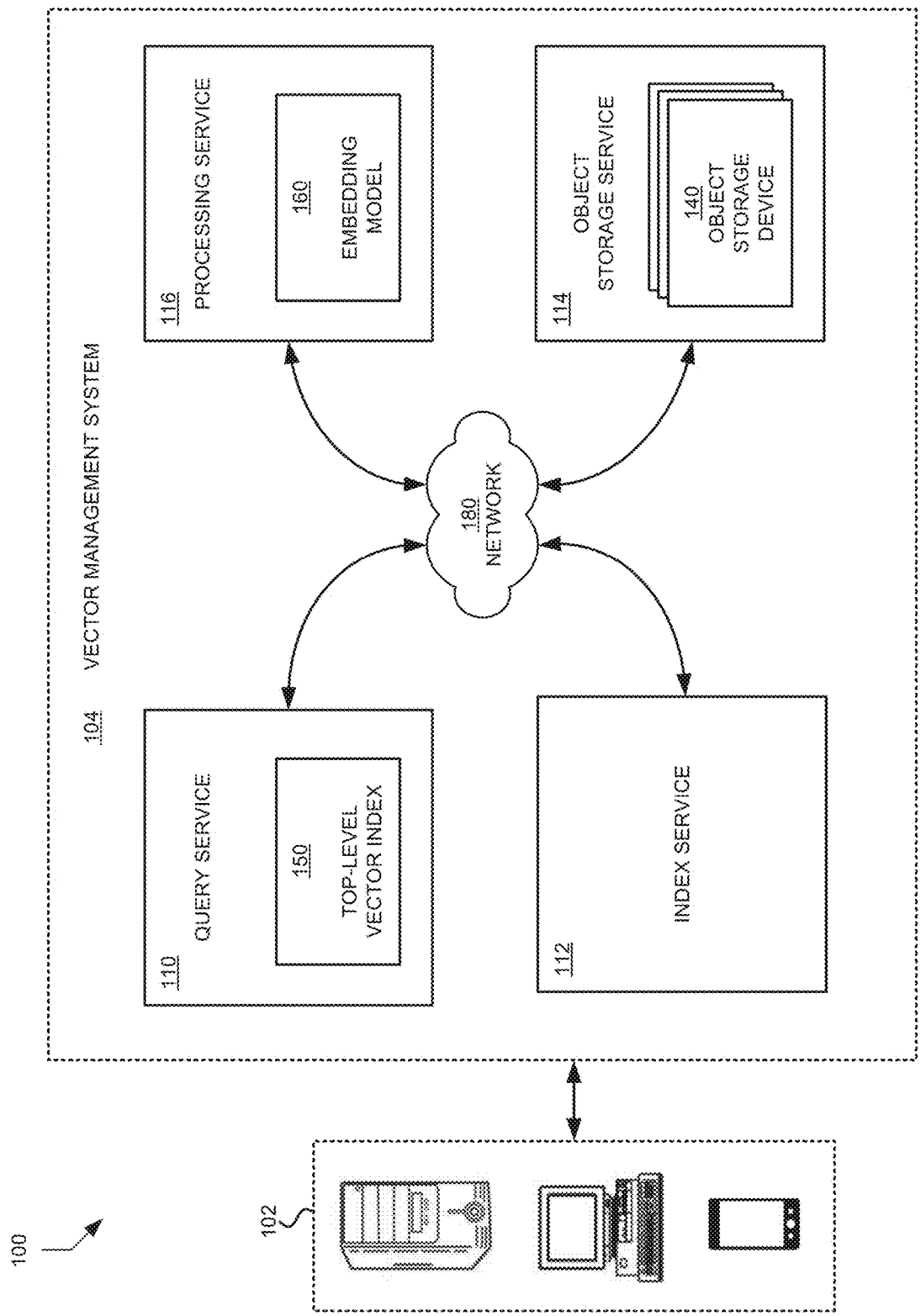
FIG. 1 is a block diagram depicting an illustrative networked computing environment in which a vector management system can operate according to some embodiments.

Generally described, the present disclosure relates to a vector storage system that provides scalable persistent storage of—and predictable performance when searching within—vector data. Predictable performance is provided in part through a proximity-based graph data structure for distributed storage systems to store and index the vector data with high throughput. Advantageously, a distributed index implemented using a proximity-based graph data structure supports various search methods (e.g., approximate nearest neighbors or "ANN"). In high volume distributed object storage systems, various optimizations and related features may be implemented to facilitate scalable and predictable searching among large quantities of vectors (e.g., billions or more).

Vector data typically consists of individual vectors, each composed of a data structure with a set of elements. The elements often comprise numerical data, such as floating-point values. A single vector may be a 1×n data structure in which the n elements (where n is a positive integer, such as 128, 1024, etc.) represent different aspects of a data item or data set. In a common implementation, vectors are used to store embeddings generated using machine learned models. For example, a data set of m different data items (e.g., catalog items, accounts, images, etc.) may be represented by a set of m vectors (where m is a positive integer). Embeddings may be used in various artificial intelligence/machine learning (AI/ML) applications, including as context to augment input to generative artificial intelligence models.

Retrieval-augmented generation (RAG) is a cost-effective method to enrich answers from generative artificial intelligence models—including foundation models—by adding context-specific information. A component of RAG is vector data: model providers or users first convert existing data into vectors using embedding models, and these vectors are searched during an augmentation step to add the additional context to the foundation model's response. One technique to find the most similar vectors to a search input is nearest neighbor search, which finds embeddings that are most similar to a search query. However, similarity-based nearest neighbor search requires searching over all available data or what could be a substantial subset of all available data, and becomes impractical for low latency or moderately low latency applications (e.g., those requiring sub-second response times). ANN algorithms can reduce query latency down to millisecond response times, but may require additional configuration to ensure they return results that are most relevant to the search terms. Additionally, while different databases with support for vector similarity search capabilities provide choice on how to build RAG applications, the design of these different database engines requires different implementations of the search algorithm, and testing has shown that these databases return different results over the same dataset and have different query response times. This makes it challenging for model providers and users to predict how their applications will behave. Moreover, vectors generated using embedding models can be many times larger than the source data from which they are generated, especially for textual data inputs (e.g., on average 3× larger, 6× larger, or more). Thus, the storage of vector data can outpace the size of the original dataset, which can lead to additional compute overhead when processing queries. The sheer volume of vector data can require use of higher density and lower performance disk storage (e.g., when compared to volatile memory), including distributed object storage systems. Moreover, conventional vector similarity search algorithms aren't optimized for retrieval from slower distributed storage systems. For example, conventional vector indices, including hierarchical navigable small worlds (HNSW), are in-memory solutions, coupling compute and storage and suffering from high memory consumption. These prevent them to scale, store vectors long term with low cost, integrate with other services, and support data lake/analytics workloads. In addition to memory limitation problems, conventional approaches suffer from an initial input/output (I/O) overhead, and to compensate they amortize this initial overhead over many queries.

Some aspects of the present disclosure address some or all of the issues noted above, among others, through a distributed proximity-based graph data structure (also referred to herein as a "distributed proximity-based graph" for brevity) for distributed object storage to store and index vectors for efficient searching. The graph is "proximity-based" in the sense that it is structured based on which vectors are similar to which other vectors (e.g., using a distance-based measurement of similarity, such as cosine similarity). The graph is "distributed" in the sense that its component vectors are stored across multiple devices of a distributed storage service (e.g., a distributed object storage service).

In some embodiments, the distributed proximity-based graph may be based on a hierarchical index of vectors, such as a hierarchical navigable small world (HNSW) index. Each vector may be part of a lowest level of a hierarchy, and may be organized according to similarity. For example, the distributed proximity-based graph may use nodes or vertices to represent vectors, and edges to connect the nodes that are closest to each other (where degree of closeness is based on, e.g., cosine similarity, Euclidian distance, etc.). Similar vectors may be grouped into leaf blocks (also referred to simply as "leaves" or "blocks" for brevity) of the distributed proximity-based graph. The leaves are stored across various storage devices of a distributed storage system. For example, the leaves are stored as leaf objects across a distributed object storage system.

The vectors may be organized into a set of objects, each as a block of vectors. The blocks serve as leaves of the distributed proximity-based graph. The blocks are indexed, for example by using a storage adaptation of HNSW, indexing each object and using a representative from each object to build the upper-level index on the blocks instead of the individual vectors (e.g., as would be done in conventional HNSW). Selecting an existing vector as the representative enables a fully in-memory search for interactive and latency sensitive use cases.

With reference to an illustrative embodiment, leaves may be indexed as objects for storage in a distributed object storage system. Vectors are first partitioned into leaf objects, using a fine-grained (balanced) clustering or an HNSW graph partitioning. The size of each object (fine-grained partition) may be set based on the trade-off of throughput, latency, resource usage and cost. Large leaf objects, which contain the vectors, are stored in an indexed format. For example, an HNSW is generated for each leaf object and stored along with the vectors. A representative for each object to be used in the upper levels of the distributed proximity-based graph is selected. This can be the centroid, median, or the vector closest to the centroid of the leaf block of vectors. In some examples, a sample of (optionally quantized) vectors may be added to enable in-memory search without any access to the distributed object storage system.

The system builds the distributed proximity-based graph index on representations of objects, as opposed to raw vectors. Then, during each iteration of a search algorithm, vectors are accessed in leaf blocks, as opposed to retrieving them one by one. This is in contrast to conventional solutions (both in-memory and on-disk) which typically require a separate I/O access for each candidate vector retrieval, thereby not benefitting from locality and unnecessarily increasing the number of I/O trips. To retrieve candidate query results (e.g., k nearest-neighbors), the system can request a batch of objects (based on centroids) via parallel or otherwise asynchronous I/O. Accessing a large batch of vectors improves throughput and recall, and reduces I/O, amortizing the latency overhead via parallelism as close objects are accessed in parallel.

Additional aspects of the present disclosure relate to use of the distributed proximity-based graph to identify storage locations for the indexed vectors. For example, a set of billions of vectors each being several kilobytes in size (e.g., hundreds or thousands of elements, with each element being a multi-byte numerical value) may be grouped ("blockized") into blocks, such as the leaves of the distributed proximity-based graph. The blocks, which may be larger than typical storage units in traditional database systems, are distributed over multiple storage devices of a distributed storage system. The proximity-based graph index of the set of vectors may be used to intelligently determine which vectors to store on which storage devices and with which other vectors.

Particular types of locality in storage of vectors in the distributed storage system can provide benefits when using a distributed proximity-based graph index. For example, it can be desirable to have graph nodes (vectors) in the same query path to be stored together within the distributed storage system (e.g., in the same leaf) to reduce or minimize the number of input/output (I/O) requests made to the distributed storage system when responding to a query. In addition, distributing similar subsets of vectors (e.g., leaves) across the different storage devices of the distributed storing system can provide parallelism when later accessing the data. More specifically, localizing storage of vectors in the same query path of the distributed proximity-based graph index can reduce number of I/O accesses (e.g., because vectors in the same query path are grouped together in the same leaf), while distributing similar leaves across the distributed storage system provides parallelism in accessing similar blocks. This latter configuration is beneficial because eventually the system will access multiple blocks (leaves) when a single block (leaf) may not be enough to get enough recall for a query.

In some embodiments, to provide locality in storage of vectors in the same query paths, a set of simulated queries may be executed using the distributed proximity-based graph. During execution of the simulated queries, query paths (also referred to herein as traversal paths) through the distributed proximity-based graph may be recorded. The traversal paths observed during execution of the simulated queries may be evaluated to identify which vectors tend to be part of the same traversal paths over the course of multiple queries. Traversal path patterns can be used to group vectors together for storage on individual storage devices—or individual pages within storage files—of a distributed storage system on which the set of vectors is stored. For example, if a first group of vectors tend to be present in traversal paths, and a second (different) group of vectors tend to be present in other (different) traversal paths, then the first group of vectors may be stored together in a first data object on one storage device or subset of storage devices, while the second group of vectors may be stored together in a second data object on the same or a different storage device or set of storage devices than the first group. Thus, when a query is being processed using the distributed proximity-based graph and the traversal of the graph leads to a vector in the first group, the entire first group may be retrieved from storage and used to generate results in a more efficient manner than if individual vectors of the first group were stored in different data objects, on different devices, etc.

In some embodiments, to leverage the distributed nature of the vector storage and provided parallelism in accessing vectors, the vectors may be "de-clustered" in some respects for storage. In contrast to the clustering that may be used to generate the higher levels of the index, different subsets of vectors (e.g., different leaves of vectors) that have some degree of similarity may be purposely placed on different storage devices of a distributed storage system. Such de-clustering at the storage level also helps dynamically keep the clusters balanced during updates. In one approach, the system may first use coarse clustering/partitioning at higher levels of the index to improve pruning in search. Such coarse clustering/partitioning can be simpler to keep balanced in comparison with more fine-grained clustering/partitioning. Then, clusters (e.g., leaves of vectors) in the lower level of the index may be de-clustered to increase parallelism and help produce leaves of equal size. By storing different but similar leaves (e.g., subsets of vectors) on different storage devices of a distributed storage system, a query system can take advantage of parallel throughput provided by the different distributed storage system to receive multiple subsets of vectors in the same (or roughly the same) time as it would take to receive just one of the subsets. Such clustering of the index at higher levels coupled with a degree of de-clustering the storage of leaves can collectively provide the benefits of each individual design, while mitigating at least some of their respective drawbacks.

Further aspects of the present disclosure relate to managing changes to a set of vectors in a manner that preserves the usefulness of the distributed proximity-based graph. In some embodiments, vectors may be added to, changed, and/or removed from a vector set after the distributed proximity-based graph is generated and the initial storage determinations have been implemented. This may be the case even if the distributed storage system on which the vectors are stored stores data in an immutable manner. To facilitate the dynamic nature of the vector data set even when using a distributed storage system that enforces immutability, a versioning system may be implemented. For example, each subset of vectors may be stored as a data object, such as a binary serialization of an HNSW or a tabular file according to the Parquet format by Apache. When a vector is added to the vector set, it may be inserted into a subset that includes its closest neighbors. When a vector is removed from the vector set, a new version of subset's index, or a new version of the manifest of the data object, may be generated in which the deleted vector is marked for deletion. When a vector is changed in the vector set, both addition and deletion operations may be performed to reflect removal of original vector and insertion of the "changed" vector. In each case, the immutable data object that stores vectors in the subset may remain unchanged (e.g., as in an immutable data store); with the relevant changes made to the index, manifest, or other file associated with the data object. At predetermined or dynamically determined intervals, a reconciliation process may execute in which a new version of the data object is generated, with any deleted vectors excluded, and new/changed vectors added.

Various aspects of the disclosure will now be described with regard to certain examples and embodiments, which are intended to illustrate but not limit the disclosure. Although aspects of some embodiments described in the disclosure will focus, for the purpose of illustration, on particular examples of network configurations, data storage architectures, data access protocols, and processing operations, the examples are illustrative only and are not intended to be limiting. In some embodiments, the techniques described herein may be applied to additional or alternative network configurations, data storage architectures, data access protocols, processing operations, and the like. Any feature used in any embodiment described herein may be used in any combination with any other feature, without limitation.

Overview of Example Computing Environment

FIG. 1 is a block diagram of an illustrative computing architecture 100 in which computing devices 102 may store data on—and query vectors from—a vector management system 104 that includes a query service 110, an index service 112, an object storage service 114, and a processing service 116. Advantageously, the computing architecture 100 may provide predictable performance for storing and managing large sets of vectors (e.g., millions, billions, or more) and searching the stored vectors for various applications, such as RAG for machine learning inference.

By way of illustration, various example computing devices 102 (also referred to as hosts) are shown in communication with the vector management system 104, including a server, a desktop computer, and a laptop. In general, the computing devices 102 can be any computing device such as a sever computer, desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, a computing device 102 may be a host computing device executing one or more virtual computing systems within a data center, which may or may not be a same data center that includes one or more computing systems of the vector management system 104.

Generally described, the vector management system 104 can operate to enable computing devices 102 to submit data—whether in vector or non-vector form—for storage at the vector management system 104. Data is converted to vector form (if needed), and stored in a distributed data store. The vector management system 104 allows users to add new vectors, and to read, write, modify, and delete previously stored vectors. Moreover, the vector management system 104 provides an efficient and predictable way to search stored vectors that are similar to a query vector (or at least most similar out of the available stored vectors).

The vector management system 104 may include a processing service 116 to process input data into vector form for storage. In some embodiments, the processing service 116 may use one or more embedding models 160 to process input data input data into vector form. For example, the processing service 116 may receive input data as a set of discrete data items. The individual data items may be processed using an embedding model 160, such as Bidirectional Encoder Representations from Transformers (BERT), to produce embeddings.

Embeddings or other vectors may be stored in a distributed object storage service 114 composed of a set of object storage devices 140. Groups of vectors may be stored together as data objects. For example, a data object may represent a cluster or other subset of vectors submitted by a computing device 102 (or a cluster or other subset of vectors generated by the processing service 116 from data submitted by a computing device 102). When processing a query, entire subsets of vectors stored together in an object may be retrieved and evaluated.

The vector management system 104 may include an index service 112 that generates and manages an index to determine where individual vectors and subsets thereof are stored within the object storage service 114. In some embodiments, the index can also be used determine the locations within the object storage service 114 at which to store the vectors or subsets thereof, to determine how to group vectors for storage, and the like. For example, the index service 112 may generate an index as a distributed hierarchical proximity-based graph that indicates which vectors are similar to each other. The vector management system 104 may then use the index to determine which vectors are to be grouped together into storage objects for storage in the object storage service 114 based on how the distributed proximity-based graph tends to be traversed when identifying vectors that are most similar to a query vector. Vectors that tend to show up in the same traversal paths can be grouped together and stored in the same storage object so that when a query is submitted, a relatively small number of storage objects can be accessed at the object storage service 114.

Objects may be stored, for example, in one or more of the object storage service's object storage devices 140, which correspond to any persistent or substantially persistent storage (including hard disk drives (HDDs), solid state drives (SSDs), network accessible storage (NAS), storage area networks (SANs), non-volatile random access memory (NVRAM), or any of a variety of storage devices known in the art). Similarities at the subset level (e.g., between subsets of vectors that are separated into different storage objects) can be identified using the index, and the vector management system 104 can use the identified similarities to leverage the throughput advantages of the distributed object storage service 114. For example, the vector management system 104 can store such storage objects on different storage devices 140 of the object storage service 114. Such de-clustering of storage of objects composed of otherwise similar vectors allows the objects to be accessed in parallel or substantially in parallel at query time, thereby reducing latency.

The vector management system 104 illustratively includes a query service 110 which provides an interface (a command-line interface (CLI), application programing interface (API), graphical user interface (GUI), or other programmatic interface) through which computing devices 102 can query the vector management system 104. For example, a computing device 102 may send request to the query service 110 to retrieve the vector or vectors, stored in the vector management system 104, that are most similar to a query vector. Such queries may be submitted by computing devices 102 performing inference using a machine learning model (e.g., a large language model (LLM) or other generative model) and desiring to augment the inference (e.g., by performing RAG).

The computing devices 102, vector management system 104, and/or individual devices thereof may communicate via a network 180, which may include any wired network, wireless network, or combination thereof. For example, the network may be or include a personal area network, local area network, wide area network, over-the-air broadcast network (e.g., for radio or television), cable network, satellite network, cellular telephone network, or combination thereof. As a further example, the network may be a publicly accessible network of linked networks, possibly operated by various distinct parties, such as the Internet. In some embodiments, the network may be a private or semi-private network, such as a corporate or university intranet. The network may include one or more wireless networks, such as a Global System for Mobile Communications (GSM) network, a Code Division Multiple Access (CDMA) network, a Long Term Evolution (LTE) network, or any other type of wireless network. The network can use protocols and components for communicating via the Internet or any of the other aforementioned types of networks. For example, the protocols used by the network may include Hypertext Transfer Protocol (HTTP), HTTP Secure (HTTPS), Secure Sockets Layer (SSL), and the like. Protocols and components for communicating via the Internet or any of the other aforementioned types of communication networks are well known to those skilled in the art and, thus, are not described in more detail herein.

The vector management system 104 is depicted in FIG. 1 as operating in a distributed computing environment including several computer systems that are interconnected using one or more computer networks. The vector management system 104 could also operate within a computing environment having a fewer or greater number of devices than are illustrated in FIG. 1. Thus, the depiction of the vector management system 104 in FIG. 1 should be taken as illustrative and not limiting to the present disclosure. For example, the vector management system 104 or various components thereof could implement various web services components, hosted or "cloud" computing environments, or peer to peer network configurations to implement at least a portion of the processes described herein. In some instances, the vector management system 104 and computing devices 102 may be part of a same cloud computing service. Further, the vector management system 104 and computing devices 102 may be implemented directly in hardware, or as a combination of software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In some embodiments, any of the components within the vector management system 104 can communicate with other components of the vector management system 104 via a network. In other embodiments, not all components of the vector management system 104 are capable of communicating with all other components of the vector management system 104. In addition, while some functionalities are generally described herein with reference to an individual component of the vector management system 104, other components or a combination of components may additionally or alternatively implement such functionalities. Thus, the specific configuration of elements within FIG. 1 is intended to be illustrative only, and is not intended to be limiting, required, or exhaustive.

Vector Lifecycle

Figure 2A:
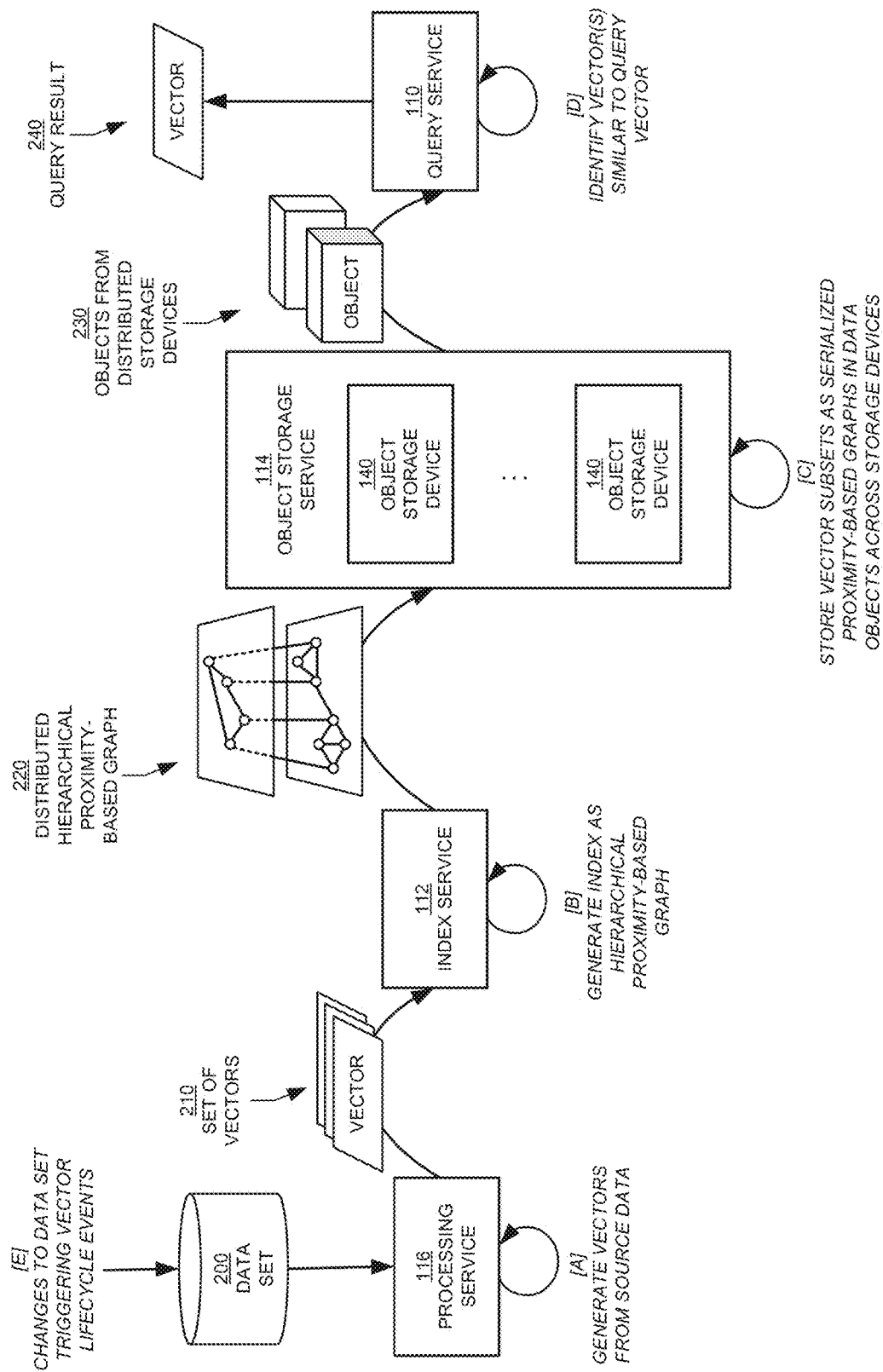
FIGS. 2A and 2B are block diagrams of illustrative data flows and interactions of components of a vector management system to manage the lifecycle of a set of vectors according to some embodiments.
Figure 2B:
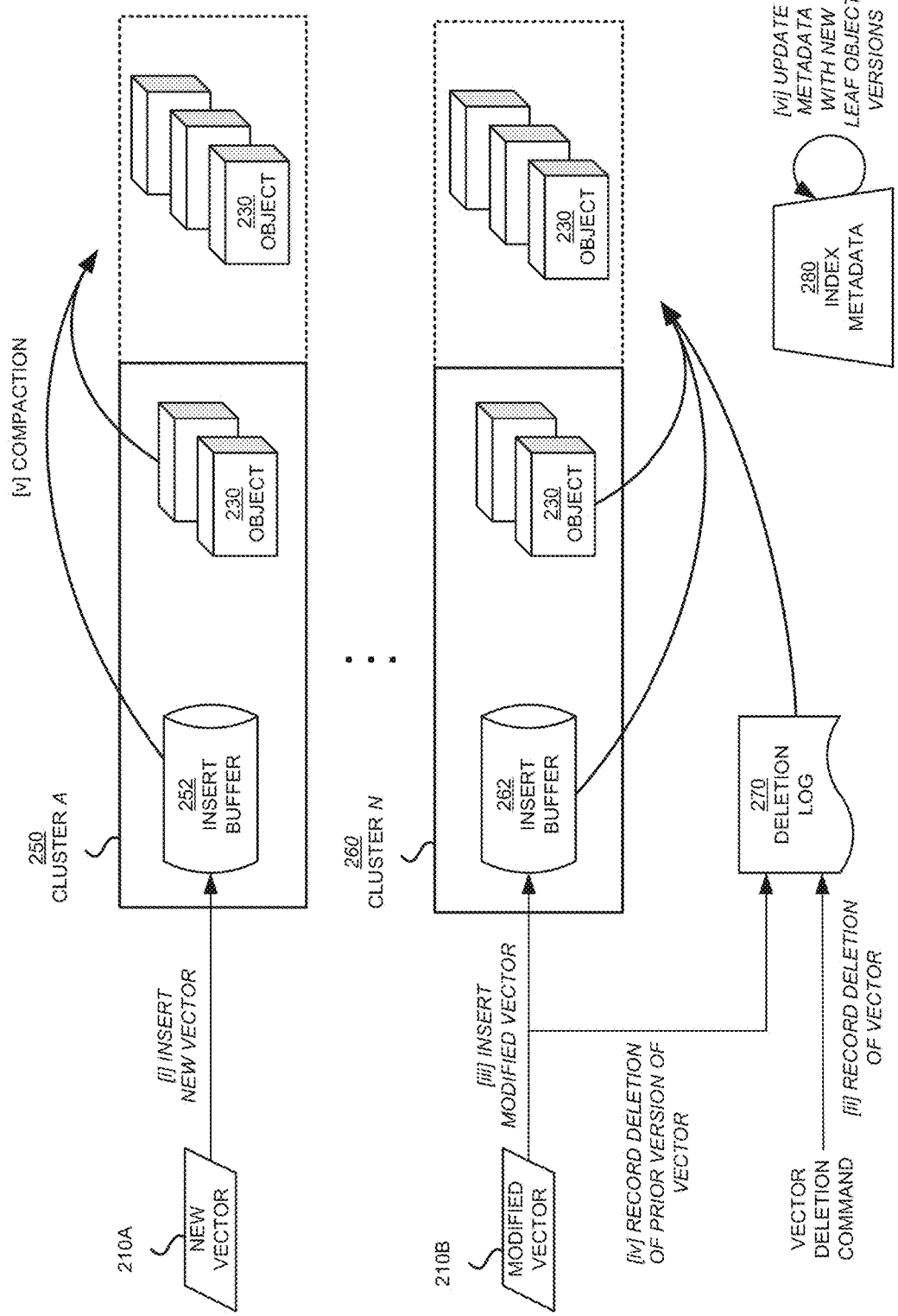

FIGS. 2A-2B illustrate example data flows and interactions between components of a vector management system 104 during the lifecycle of a vector data set.

As shown in FIG. 2A, a data set 200 may be initially received by the processing service 116 to be converted into vector form. Illustratively, the data set 200 may be a catalog of product listings, a set of articles, details about individual transactions, or another set of discrete data items. At [A], the processing service 116 may convert the individual data items into vectors 210. For example, the processing service 116 may map portions of a data item to individual elements of a vector. In some embodiments, the processing service 116 may use an embedding model to generate vector representations of the individual data items. For example, if the vectors are being generated for use in performing RAG with a foundation model (e.g., augmented generative inference performed with the foundation model), an embedding model 160 that is configured to generate vectors 210 of the same size (e.g., the same quantity of dimensions) as can be input into a foundation model may be used.

At [B], the index service 112 can generate an index 220 of the vectors 210. The index 220 may be a distributed hierarchical proximity-based graph, such as an HNSW. To generate the index 220, the index service 112 may perform clustering on the vectors 210 to generate subsets of vectors that are similar to each other, or at least more similar to each other than to other vectors 210 in the overall set of vectors. Each vector may be connected (e.g., using an edge of the distributed proximity-based graph) to one or more of the closest other vectors in the subset. Thus, each subset of vectors may be represented by a flat proximity-based graph, or by its own hierarchical proximity-based graph (e.g., an HNSW for each subset of vectors).

To make the full index hierarchical, a representative vector for each subset may be generated or selected. For example, a vector that is closest to the centroid or mean of the cluster on which the subset is based may be selected. As another example, a vector may be generated based on the centroid or mean, even if no vector in the cluster has the same elemental values as the centroid or mean. The index service 112 may then generate a higher-level proximity-based graph of the representative vectors. This proximity-based graph is smaller in size than the combined bottom-level graphs of all vectors, while still providing access to each of the vectors through the connections of the bottom-level graph. In some embodiments, the index service 112 can select a sample of vectors and apply quantization on them. The index service 112 may use two parameters: first, the quantity of vectors to sample, and second, the degree to which to quantize the vectors. For example, if selecting only the centroid, there is one vector and the index service 112 may apply no quantization. On the other exterme, if selecting all vectors a high degree of quantization may be applied. In use, an upper level search can be done on centroids in the first example, and the second example is a full search but on quantized data. Intermeidate degrees of quantization, porportional to the quantity of vectors selected, may be applied if fewer than all vectors but more than one vector is selected for the sample.

Depending upon the size the data set, the number of representative vectors, and the amount of storage and compute available, the index service 112 may generate any number of higher-level proximity-based graphs until top-level proximity-based graph with a desired size is produced (e.g., a graph that is small enough for the query service 110 to maintain in memory). For example, with a vector set having billions or trillions of vectors to be indexed, the index service 112 may generate two or three hierarchical levels above the bottom-level graph of all vectors, with a top-level graph having not more than a few thousand vectors. An example routine to generate a hierarchical proximity-based graph index is described in greater detail below.

At [C], the vector management system 104 can store the vectors 210 and index 220 in the object storage service 114. In some embodiments, the bottom-level proximity-based graph of each individual subset of vectors 210 is serialized, binarized, or otherwise processed into a form for storage as individual objects. The objects may then be stored on the object storage devices 140 of the object storage service 114. If there are one or more intermediate-level proximity-based graphs between the bottom-level and the top-level, then those intermediate-level proximity-based graphs may be similarly processed into a form for storage as individual object.

At [D], the query service 110 may use the index 220 to obtain results 240 for a query. The query may include a query vector for which the closest vector(s) in the set of vectors 210 is/are to be identified. In some embodiments, the query service 110 may maintain the top level of the distributed hierarchical proximity-based graph 220 in memory, cache, or other local storage. For example, as shown in FIG. 1, the query service 110 may maintain top-level vector index 150. In some embodiments, the top-level vector index 150 may be stored in the object storage service 114 and retrieved from there by the query service 110 (if not already cached at the query service 110) in response to a vector query. For example, if the query service 110 is used to query vectors in multiple sets of vectors 210, each having its own index 220, the query service 110 may load the appropriate top-level vector index 150 at query time. The query service 110 may identify the representative vector or vectors that are most similar to the query vector (e.g., using cosine similarity, Euclidian distance, etc.). The query service 110 may then obtain, from the object storage service 114, those data objects 230 with the vectors represented by the identified representative vectors. The query service 110 may use the bottom-level proximity-based graph to quickly determine the vector(s) that is/are most similar to the query vector, and return the determined vector(s) as the query result. An example routine for using a distributed hierarchical proximity-based graph index to process a query is described in greater detail below.

At [E], the vector management system 104 may process various vector lifecycle events. Vector lifecycle events may include creation/addition of new vectors to the set of vectors 210, deletion of vectors from the set of vectors 210, modification vectors in the set of vectors 210, or other such events. Due to the hierarchical proximity-based index 220 that is used to process queries efficiently, and the object-based storage of subsets of the vectors 210, handling such vector lifecycle events may require or benefit from processing that is more involved than merely inserting, modifying, and deleting vectors.

FIG. 2B illustrates various vector lifecycle events, including insertion, update, and deletion events associated with the set of vectors 210. In some embodiments, the vectors and indices are stored as immutable objects in a data store. To facilitate the dynamic nature of the vector data set even when using a distributed storage service that enforces immutability, buffers and a versioning system may be implemented. For example, each subset of vectors may be stored as a leaf data object, such as a binary serialization of an HNSW or a tabular file according to the Parquet file format by Apache. The leaf data objects may be grouped such that multiple leaf data objects, each with multiple vectors, are managed as a cluster organized within the entire set of vectors using a course upper-level index as described herein. For example, a set of 1 billion vectors can be indexed by a two-level clustering with 2,048 course-indexed clusters, where each cluster has 32 fine-indexed leaf blocks, and where each leaf block has 20,000 vectors (2,048×32×20,000=over 1.3 billion vectors). High-level clusters that are coarse grained in this manner are generally tolerant to imbalanced insertions. Some coarse-grained clusters may end up having similar volumes/rates of changes (insertions, updates, and deletions), and therefore the clustering may remain high in quality relative to the case where the changes are made directly to fine-grained clusters, such as across all leaves.

In embodiments where the leaf blocks 230 are stored as immutable objects in the distributed object storage service 114, one or more insert buffers may be used to temporarily maintain new vectors until a threshold number of new vectors has been received, until a threshold period of time has passed since the insert buffer was last flushed, or until occurrence of another event that triggers a flush of the buffer. For example, as shown in FIG. 2B, the set of vectors 210 may be organized into clusters, including cluster A 250 and cluster B 260, each comprising its own respective set of data objects 230, also referred to herein as leaf objects 230. A separate insert buffer may be maintained for each cluster: insert buffer 252 for cluster A 250, and insert buffer 262 for cluster B 260. In some embodiments, multiple insert buffers can be used for a single cluster.

Some examples of a streaming vector store that may be used for insert buffers are disclosed in co-owned U.S. Patent Application No. 18/757,112, filed Jun. 27, 2024 and titled "User-Configurable Object Generation," the contents of which are incorporated by reference herein and made part of this specification.

When a vector is added to the vector set, it may be inserted into a cluster that includes its closest neighbors. The insertion operation may be performed by initially storing the vector in the insert buffer for the cluster. For example, vector 210A is to be inserted into cluster A 250 at [i] (e.g., cluster A 250 is identified for vector 210A based on a nearest-neighbors search). The vector 210A is initially stored in insert buffer 252 for cluster A 250. In some embodiments, the buffer 252 may be an append-only buffer to which new vectors, including vector 210A, are inserted in sequential order. This configuration can provide fast write performance for storing new vectors. If the insert buffer 252 overflows, the vectors stored in the buffer 252 may be flushed to the distributed object storage service 114 (e.g., as an object comprising the vectors in the buffer 252 at the time it is flushed). The now-empty buffer 252 may continue to be used, or a new insert buffer may be created for the same cluster.

Insert buffers may have a maximum capacity. In some embodiments, the maximum capacity of insert buffer 252 may depend on available memory or a predetermined threshold. For example, the maximum capacity may be set to n vectors (e.g., n=1000 vectors) where such a size provides comparable performance to the remainder of the index. As another example, the maximum capacity may be set to a fixed size n (e.g., n=4 megabytes) that corresponds to turning point of efficiency of hierarchical graph search methods (e.g., HNSW) over sequential scan.

In some embodiments, index metadata 280 may be maintained regarding the current state of the index 220. For example, when an insert buffer overflows and is flushed to the distributed object storage service 114, the index metadata 280 may be updated to reflect the current location of the flushed vectors. As another example, index metadata 280 may include data regarding the versions of leaf objects for use in responding to queries and performing compaction, as discussed in greater detail below. The index metadata 280 may also maintain data regarding prior versions to enable rollbacks.

When a vector is removed from the vector set, the deletion may be initially recorded at [ii] using a deletion log 270 due to the immutable nature of the leaf object 230 in which the vector is stored. In some embodiments, the deletion log 270 may be maintained in memory (e.g., in memory of the query service 110) for fast reference when responding to a query.

The vector to be deleted may be a vector in one of the insert buffers, or stored in a leaf object 230 in the distributed object storage service 114. The deletion log 270 may be updated to mark the deleted vector, stored at its current storage location, as deleted. In addition, the index 220 may be updated to reflect the deletion. For example, index metadata 280 for the index 220 may maintain a listing of all vectors that have been deleted so that they are no longer considered during the process of responding to a query. A periodic or ad hoc garbage collection process may be executed to remove deleted and outdated vectors, such as by creating new versions of leaf objects 230 excluding deleted vectors.

When a vector is changed in the vector set, both addition and deletion operations may be performed to reflect removal of original vector and insertion of the "changed" vector. In each case, the immutable data object that stores vectors in the subset initially remains unchanged. In some embodiments, the relevant changes are made to the insert buffer for the affected cluster, and to the deletion log. For example, as shown in FIG. 2B, modified vector 210B may be saved in two steps, which may be performed serially, in parallel, or asynchronously: (1) the modified vector 210B is stored in insert buffer 262 for the corresponding cluster 260; and (2) the prior version of the vector that has been modified is marked as deleted in the deletion log 270.

At [v] a compaction process may be performed to merge insert buffers into the corresponding clusters. The compaction process may be triggered when the insert buffers reach a capacity threshold. In some embodiments, the compaction process may be triggered at periodic intervals (e.g., every n units of time, such as hours, days, or weeks), or upon request (e.g., by a database administrator). The interval for compaction may be a configurable parameter, to balance a trade-off between insertion efficiency and freshness of data.

Compaction may involve flushing each of the insert buffers 252, 262, and using any temporary objects stored in the distributed storage system as a result of prior between-compaction buffer flushing processes. The vectors obtained from the buffers and/or temporary objects can be matched with their appropriate leaf objects 230, and the group of leaf object vectors and inserted vectors can be combined into next-version leaf objects 230 (e.g., second version leaf objects). In some embodiments, records from the deletion log 270 may also be used during compaction, to exclude deleted vectors from the next version of leaf objects. The index metadata 280 may be updated with the new leaf object version at [vi].

The appropriate leaf object 230 for a given inserted vector during compaction may be a leaf object with vectors most similar to the inserted vector. In some embodiments, selecting appropriate leaf object may involve a trade-off in (1) accuracy of the leaves in terms of their clustering quality, with (2) minimizing the number of leaves touched in compaction. For example, rather than simply grouping each inserted vector into the leaf block with vectors most similar to the inserted vector, the system may group some vectors into leaf blocks with the second- or third-most similar vectors, when doing so reduces the overall number of leaf blocks that are to be recreated as new versions.

When responding to a query, the query service 110 may search both the index 220, and the insert buffers 252, 262. For example, the query service 110 may traverse the distributed proximity-based graph to identify nearest neighbors for a query vector while, in parallel or asynchronously, performing a sequential search of insert buffers 252, 262 to identify any recently inserted vectors that are to be returned in a nearest neighbors search. The query service 110 may also check the deletion log 270 and exclude, from the query results, any vector that has been marked for deletion.

Vector Indexing

Figure 3:
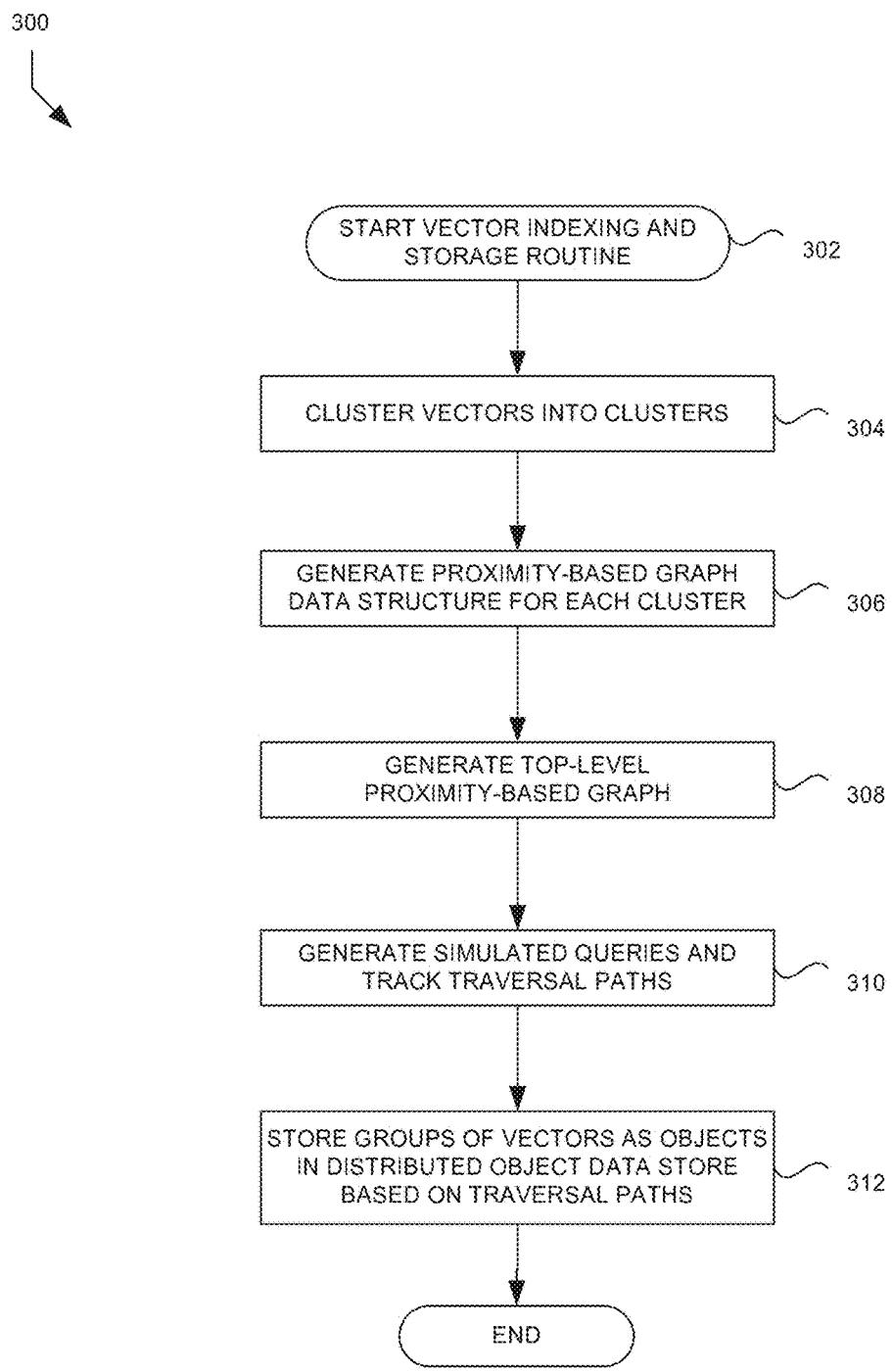
FIG. 3 depicts a flow diagram of an illustrative routine for generating a vector index as a distributed hierarchical proximity-based graph according to some embodiments.

FIG. 3 is a flow diagram of an illustrative routine 300 that may be executed by an index service 112 to index a set of vectors 210. Aspects of the routine 300 will be described with further reference to the illustrative data flows shown in FIG. 4, and the illustrative distributed proximity-based graph shown in FIG. 5.

The routine 300 may begin at block 302 in response to an event, such as when the index service 112 begins operation, when the processing service 116 generates a set of vectors to be indexed, when the vector management system 104 receives a set of vectors to be indexed, when the processing service 116 generates a set of vectors to be indexed, or some other event. When the routine 300 is initiated, a set of executable program instructions stored on one or more non-transitory computer-readable media (e.g., hard drive, flash memory, removable media, etc.) may be loaded into memory (e.g., random access memory or "RAM") of a computing device and executed. In some embodiments, the routine 300 or portions thereof may be implemented on multiple processors, serially or in parallel.

At block 304, the index service 112 can group the vectors 210 into initial subsets. In some embodiments, the grouping may be based on clustering. For example, the index service may use a clustering algorithm such as k-means clustering, density-based spatial clustering of applications with noise (DBSCAN), mean-shift clustering, expectation-maximization clustering using Gaussian mixture models, agglomerative hierarchical clustering, or another clustering algorithm to cluster the vectors. This initial clustering process may be performed to produce clusters to serve as the lowest-level subsets for storage, indexing, and searching.

In one specific non-limiting example, the n vectors 210 (where n is an integer) are clustered into c course clusters, and therefore there are c centroids (where c is an integer). For example, if n=100 billion vectors, the initial clustering step may produce c=10 million course clusters, each having n/c=10,000 vectors.

In some embodiments, vectors are not clustered first, and routine 300 proceeds to block 306 without first performing the operations described herein with respect to block 304.

At block 306, the index service 112 may generate a proximity-based graph for each of the clusters. The proximity-based graph may encode information about which vectors of a given cluster are most similar to which other vectors of the cluster. For example, a proximity-based graph such as an HNSW may use the individual vectors as nodes or vertices. Edges of the graph serve to indicate which vectors are most similar; a relatively small number of similar vectors may be identified for each vector of the cluster (e.g., 2-3 per vector), and those relationships are represented by edges.

At block 308, the index service 112 may generate a top-level or "course" proximity-based graph that links each of the proximity-based graphs for the individual clusters. The top-level proximity-based graph may be course in the sense that it includes vectors representing subsets of the overall set of vectors, rather than all vectors in the overall set of vectors being index. To generate the top-level proximity-based graph, the index service 112 may produce a set of representative vectors, including one or more vectors for each cluster. In some embodiments, the index service 112 may, for each cluster, select the vector that is closest to the centroid or mean of the cluster. In some embodiments, the index service 112 may, for each cluster use the centroid or mean of each cluster as the representative vectors for the respective clusters.

The index service 112 may then generate the top-level proximity-based graph using the representative vectors. The top-level proximity-based graph may encode information about which representative vectors are most similar to which other representative vectors. For example, a proximity-based graph such as an HNSW may use the individual representative vectors as nodes or vertices. To reduce the amount of storage required for the top-level proximity-based graph, the representative vectors may be quantized. Edges of the graph serve to indicate which representative vectors are most similar; a relatively small number of similar representative vectors may be identified for each representative vector of the cluster (e.g., 2-3 per vector), and those relationships are represented by edges. The combination of the top-level proximity-based graph and all of the bottom-level proximity-based graph (and any intermediary graphs) may form the full index of the set of vectors 210.

Figure 4:
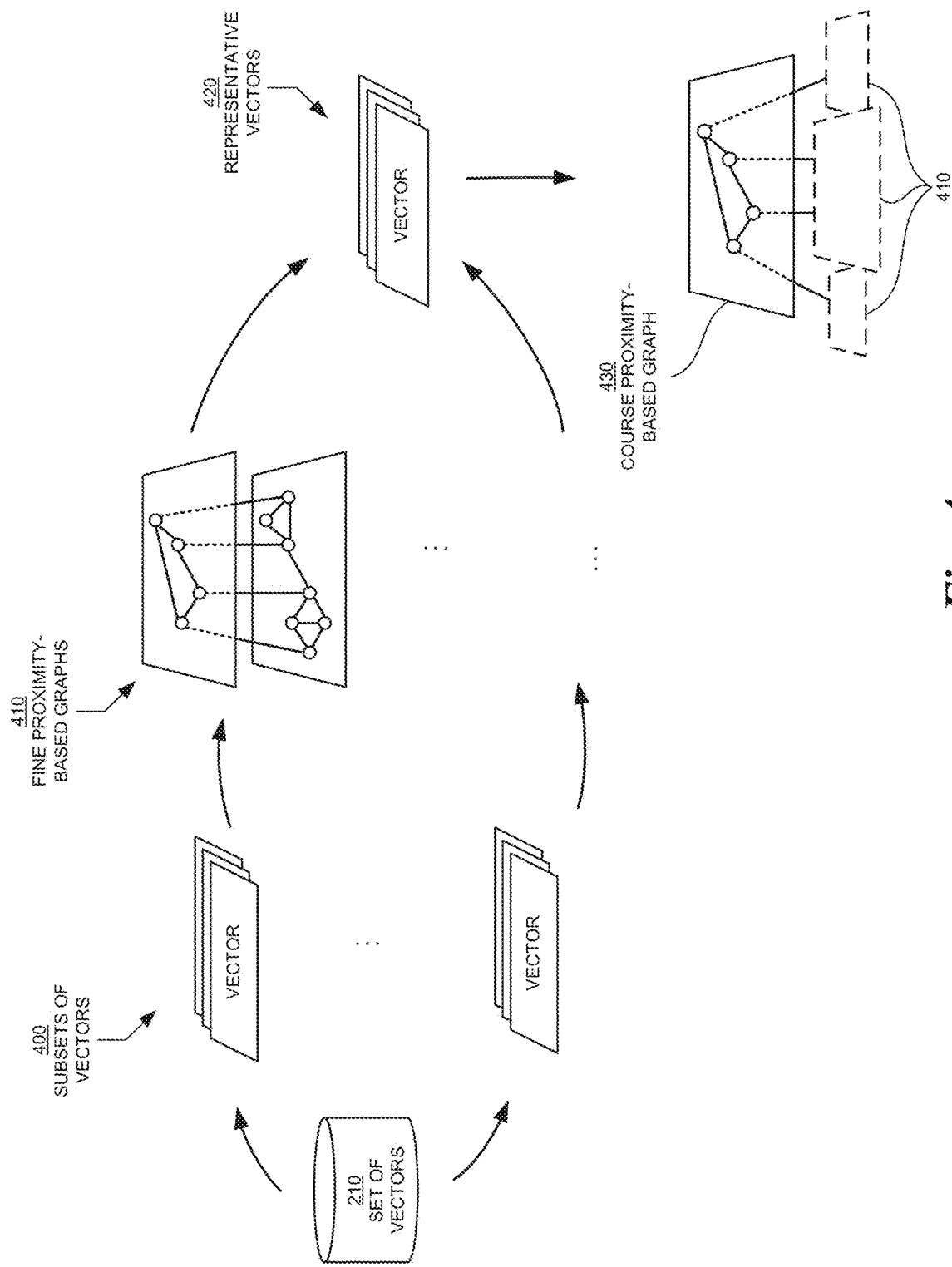
FIG. 4 is a diagram of illustrative operations for generating a vector index as a distributed hierarchical proximity-based graph according to some embodiments.

FIG. 4 illustrates an example of a set of vectors 210 clustered into vector clusters 400. Once the vector clusters 400 have been determined, the index service 112 generates proximity-based graphs 410 for each cluster, resulting in multiple proximity-based graphs. From each cluster, one or more representative vectors 420 are selected or generated. The index service 112 may then generate a top-level proximity-based graph 430 with the representative vectors 420. Thus, the top-level proximity-based graph 430 links every individual vector in the set of vectors 210 in a manner that is searchable to respond to queries.

Returning to FIG. 3, the index service 112 may use the index (e.g., the combination of bottom-level proximity-based graphs 410 for each cluster, and the top-level proximity-based graph 430, and any intermediate proximity-based graphs) to determine certain storage parameters for the vectors. At block 310, the index service 112 may in some embodiments generate simulated queries (e.g., query vectors for which similar vectors from the set of vectors 210 are to be identified) and track the index traversal paths for the simulated queries. The traversal paths may be used to partition the distributed proximity-based graph index based on similarity query patterns.

Figure 5:
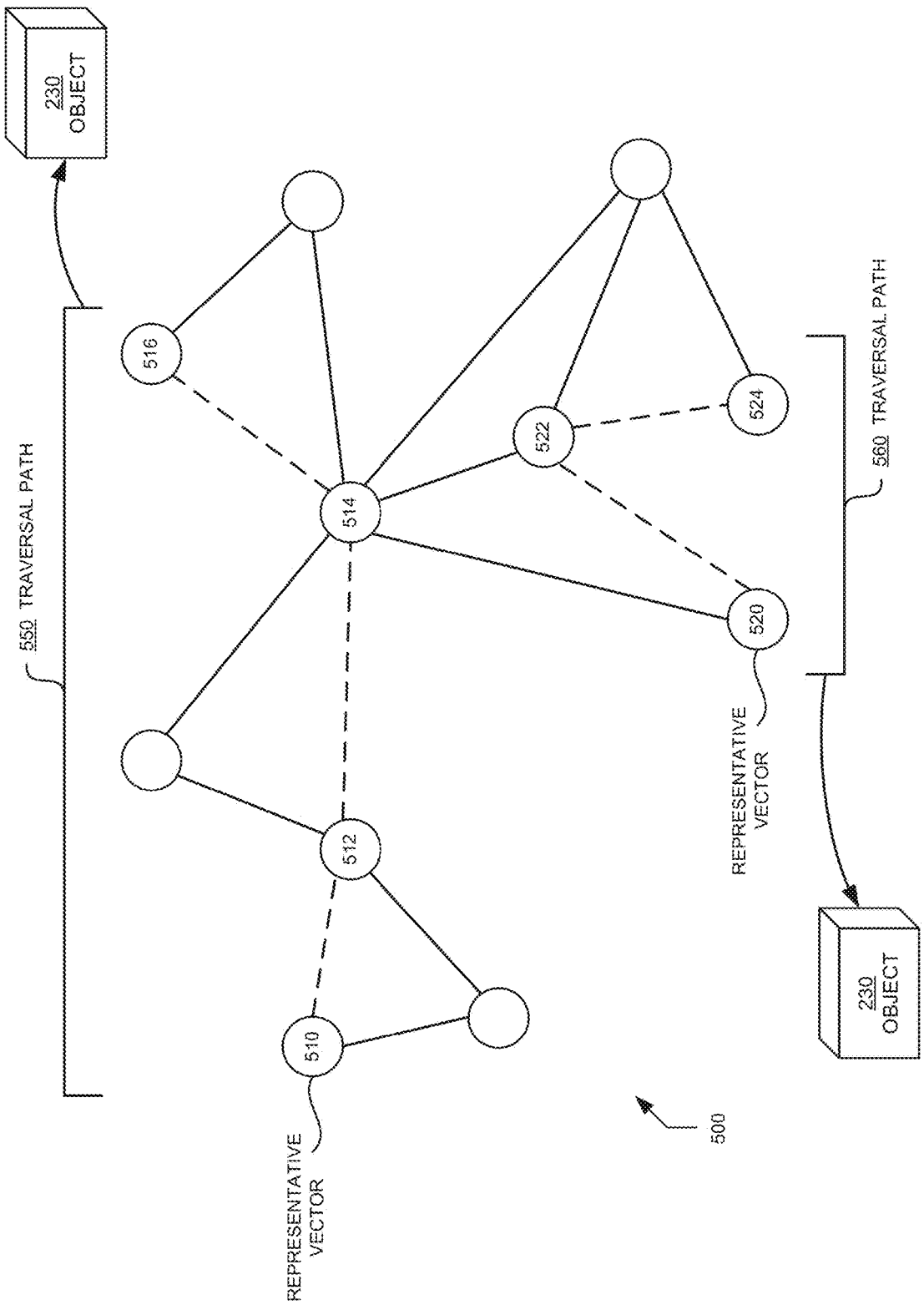
FIG. 5 is a diagram showing illustrative proximity-based graphs, and traversal paths through the distributed hierarchical proximity-based graphs, according to some embodiments.

FIG. 5 illustrates a sample portion of bottom-level proximity-based graph 500 from a combined index of all vectors of a data set. The index service 112 may obtain or generate test query vectors for which the closest vector or vectors from the set of vectors 210 are to be identified using the index. The index service 112 may process the queries (or use the query service 110 as described in greater detail below) using the distributed proximity-based graph. When processing the queries, the index service 112 may identify representative vectors from the top-level proximity-based graph that are most similar to the queries, and use links between those representative vectors and the bottom-level graph. For example, the index service 112 may identify representative vector 510 for a first subset of test query vectors, and determine that vectors 512, 514, and 516 tend to be the next vectors occurring in traversal paths to identify the vectors most similar to the first subset of test query vectors. The index service 112 may identify these vectors as forming group 550. As another example, the index service 112 may identify representative vector 520 for a second subset of test query vectors, and determine that vectors 522 and 524 tend to be the next vectors occurring in traversal paths to identify the vectors most similar to the second subset of test query vectors. These vectors may form group 560. The index service 112 may record data regarding these commonly taken traversal paths.

Returning to FIG. 3, at block 312 the index service 112 or some other component of the vector management system 104 may store groups of vectors as objects in the distributed object storage service 114 based on the traversal paths observed at block 310. In some embodiments, the index service may group vectors that tend to be part of the same traversal paths together for storage. For example, vectors in group 550 in FIG. 5 may be stored together in a data object, while vectors in group 560 may be stored together in a different data object. Advantageously, this can improve searching efficiency because when a query vector is determined to be most similar (or exhibit a threshold degree of similarity) to a particular representative vector in the top-level proximity-based graph, the index service 112 can obtain, from storage, a single data object including other vectors likely to be identified next when traversing the index. In contrast, if traversal path patterns were not used to group vectors for storage, the index service 112 may need to obtain, from storage, multiple data objects each time similar traversal paths occur, which can in some cases increase latency and lower overall performance.

In addition (or in alternative) to using traversal-path based grouping of vectors for generating storage objects, the index service 112 can store different storage objects in a de-clustered manner across different storage devices of the object storage service 114. Doing so can leverage the distributed nature of the object storage service 114. For example, the object storage service 114 may be configured to provide data from multiple different devices 140 substantially in parallel or asynchronously rather than serially. Thus, if an amount of data is to be retrieved from object storage service 114, such as multiple data objects totaling several megabytes or gigabytes, the object storage service 114 can provide the data faster from two or more different object storage devices 140 than from a single object storage device 140. In some cases, providing an amount of data from each of multiple different object storage devices 140 substantially in parallel is just as efficient as providing the amount of data from a single storage device.

To leverage the high throughput provided by the distributed configuration of an object storage service 114, the index service 112 or some other component of the vector management system 104 can store objects that may have similar vectors (e.g., vectors that are more similar to each other than to vectors in other objects; groups of vectors with a threshold degree of similarity) on different object storage devices 140. As a result, when a query vector is being processed and multiple objects of candidate vectors are to be evaluated, the query service 110 can obtain the multiple objects in parallel or otherwise non-serially, thereby facilitating retrieval of multiple objects and subsets of vectors in the same or substantially the same time as retrieval of a single object and subset of vectors.

Vector Query Processing

Figure 6:
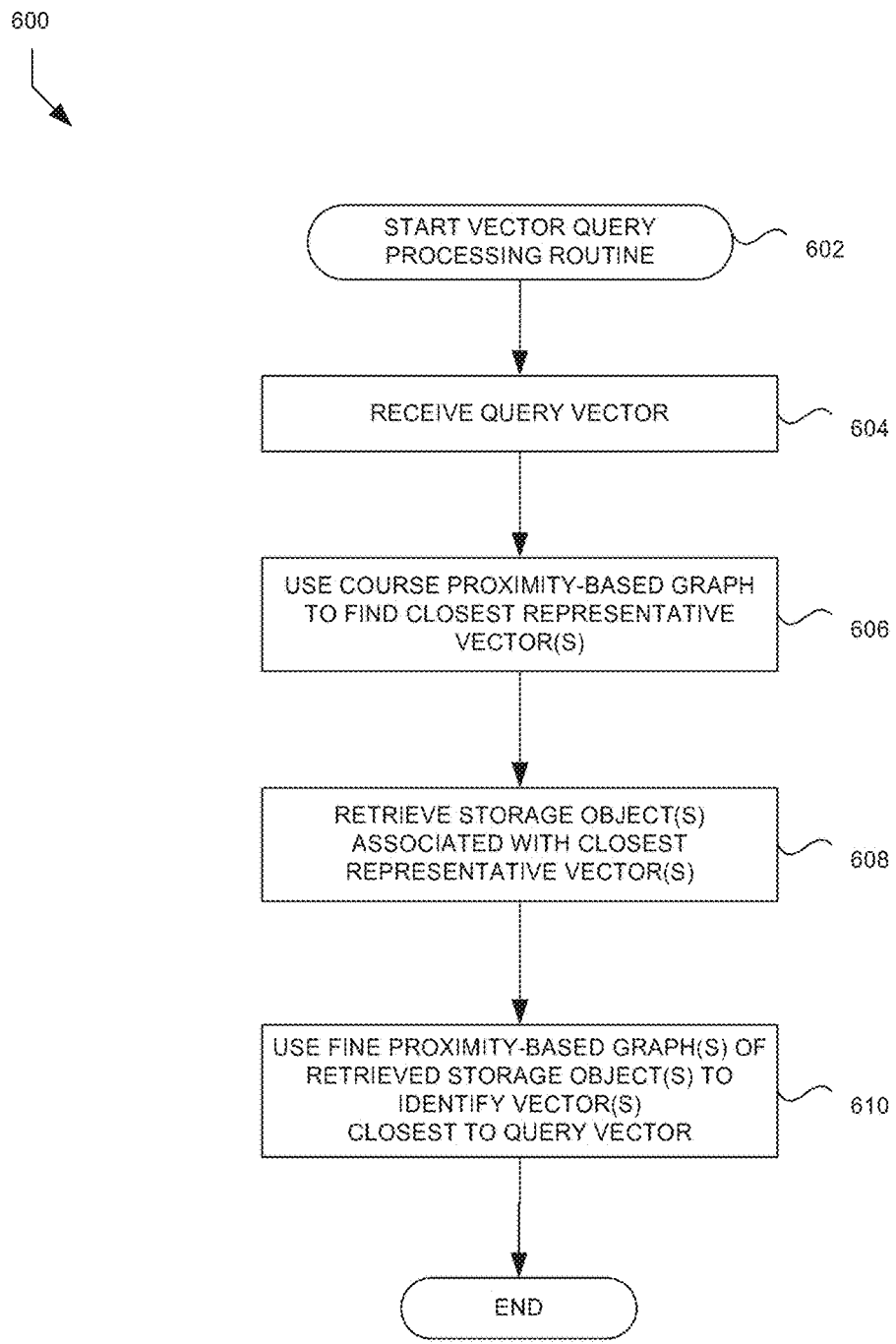
FIG. 6 is a flow diagram of an illustrative routine for querying vector data using a distributed hierarchical proximity-based graph index according to some embodiments.

FIG. 6 is a flow diagram of an illustrative routine 600 that may be executed by a query service 110 to process a vector query. Generally described, processing a vector query involves determining which vector or vectors, of a target set of vectors, is/are most similar to a query vector. Uses of such a query may include, for example: RAG for foundation model inference, searching for data items (e.g., unstructured data) represented by the vectors or from which the vectors were generated, and other applications.

The routine 600 may begin at block 602 in response to an event, such as when the query service 110 begins operation, or is invoked by a computing device 102 or a component of the vector management system 104. When the routine 600 is initiated, a set of executable program instructions stored on one or more non-transitory computer-readable media (e.g., hard drive, flash memory, removable media, etc.) may be loaded into memory (e.g., random access memory or "RAM") of a computing device and executed. In some embodiments, the routine 600 or portions thereof may be implemented on multiple processors, serially or in parallel.

At block 604, the query service 110 can receive a query vector. The query vector may be a vector for which one or more closest vectors, out of a set of vectors in the object storage service 114, are to be identified.

At block 606, the query service 110 can use a course proximity-based graph to narrow the vector search space and identify subsets of vectors for further analysis. The course-proximity-based graph may be the top-level vector index 150, such as the top-level hierarchical proximity-based graph of representative vectors generated by the index service 112 as described in greater detail above. In some embodiments, the course proximity-based graph may be stored in memory or persistent storage of the query service 110, and may therefore be used immediately or substantially immediately after receiving the query vector. In some embodiments, the course proximity-based graph may be stored at the object storage service 114 or some other location accessible to the query service 110 via a network. In such cases, the query service 110 may retrieve the course proximity-based graph for use in processing present query.

To use the course proximity-based graph, the query service 110 may identify which vector(s) of the course proximity-based graph is/are most similar to the query vector. Similarity may be based on various vector comparison methodologies, such as cosine similarity, Euclidean distance, and the like. In some embodiments, the course proximity-based graph may include quantized representative vectors. In such cases, the query vector may be evaluated for similarity with the quantized representative vectors.

The query service 110 may start at an entry point corresponding to a vertex (associated with a representative vector), determine which vector(s) connected to the entry point by edges are closest, evaluate other vectors connected to that vector by additional edges, and so on until a terminal vector is reached or until no additional vector is otherwise closer to the query vector. If the course proximity-based graph is itself a hierarchical graph (e.g., an HNSW), then the query service 110 may proceed down one or more levels of the hierarchy when a vertex connected to a lower level is reached.

At block 608, the query service 110 may initiate retrieval of data from the object storage service 114. The set of vectors being queried may be stored across any number of object storage devices 140. Each of the object storage devices 140 may include any number of discrete subsets of vectors, and all vectors in a particular subset may be stored in the same data object. A data object may be a serialization or binary version of a bottom-level proximity-based graph into which the vectors have been organized.

To retrieve data from the object storage service 114, the query service 110 can retrieve the data object(s) corresponding to the representative vector(s) identified from the course proximity-based graph. If the object storage service 114 supports high-throughput retrieval via parallel access to different object storage devices 140, then the query service 110 may obtain multiple data objects. In this way, the query service 110 can obtain more vectors for analysis in the same or substantially the same amount of time as it would take to obtain fewer vectors (e.g., just one data object from one object storage device 140).

At block 610, the query service can use a fine proximity-based graph to identify specific vectors that are most similar to the search query. The fine proximity-based graph may be the bottom-level proximity-based graph of an individual subset of vectors, as described in greater detail above. To use the fine proximity-based graph, the query service 110 may identify which vector(s) of the fine proximity-based graph is/are most similar to the query vector. Similarity may be based on various vector comparison methodologies, such as cosine similarity, Euclidean distance, and the like. In some embodiments, the fine proximity-based graph may include quantized vectors. In such cases, the query vector may be evaluated for similarity with the quantized vectors.

The query service 110 may start at an entry point corresponding to a vertex (e.g., associated with a representative vector identified at block 606), determine which vector(s) connected to the entry point by edges are closest, evaluate other vectors connected to that vector by additional edges, and so on until a terminal vector is reached or until no additional vector is otherwise closer to the query vector. If the fine proximity-based graph is itself a hierarchical graph (e.g., an HNSW), then the query service 110 may proceed down one or more levels of the hierarchy when a vertex connected to a lower level is reached.

Execution Environment

Figure 7:
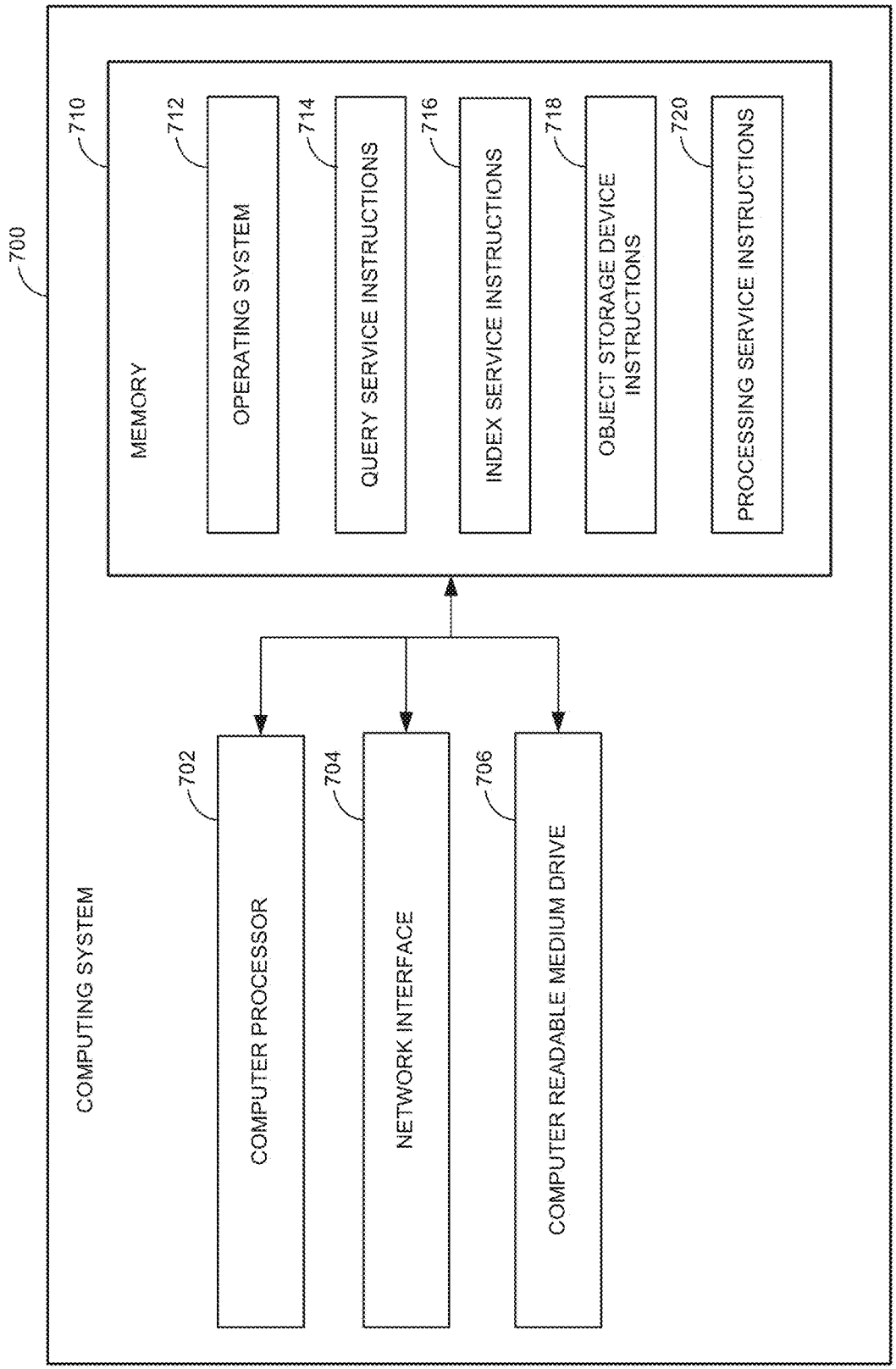
FIG. 7 is a block diagram of an illustrative computing system configured to provide features of a vector management system according to some embodiments.

FIG. 7 illustrates various components of an example computing system 700 configured to implement aspects pf one or more of the services (e.g., query service 110, index service 112, object storage service 114, processing service 116) of the vector management system 104 as described herein.

In some embodiments, as shown, a computing system 700 may include: one or more computer processors 702, such as physical central processing units ("CPUs"); one or more network interfaces 704, such as a network interface cards ("NICs"); one or more computer readable medium drives 706, such as a high density disk ("HDDs"), solid state drives ("SSDs"), flash drives, and/or other persistent non-transitory computer readable media; one or more input/output device interfaces; and one or more computer-readable memories 710, such as random access memory ("RAM") and/or other volatile non-transitory computer readable media.

The computer-readable memory 710 may include computer program instructions that one or more computer processors 702 execute and/or data that the one or more computer processors 702 use in order to implement one or more embodiments. For example, the computer-readable memory 710 can store an operating system 712 to provide general administration of the computing system 700. As another example, the computer-readable memory 710 can store query service instructions 714 for implementing the functionality of the query service 110. As another example, the computer-readable memory 710 can store index service instructions 716 for implementing the functionality of the index service 112. As another example, the computer-readable memory 710 can store object storage device instructions 718 for implementing the functionality of an object storage device 140. As another example, the computer-readable memory 710 can store processing service instructions 720 for implementing the functionality of the processing service 116.

Terminology and Additional Considerations

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A vector management system comprising:
   a distributed object storage service comprising a plurality of object storage devices;
   a processing service comprising one or more processors configured to execute specific instructions, the processing service configured to generate a set of vectors from a set of source data;
   an index service comprising a set of one or more processors configured to execute specific instructions, the index service configured to:
      generate an index of the set of vectors as a distributed hierarchical proximity-based graph data structure, wherein the distributed hierarchical proximity-based graph data structure comprises:
         a different fine proximity-based graph data structures for each subset of a plurality of subsets of vectors of the set of vectors; and
         a course proximity-based graph data structure comprising at least one representative vector for each subset of the plurality of subsets of vectors, wherein the course proximity-based graph data structure links the different fine proximity-based graph data structures to form the distributed hierarchical proximity-based graph data structure; and
      store the set of vectors across the plurality of object storage devices of the distributed object storage service based on the distributed hierarchical proximity-based graph data structure, wherein a subset of the set of vectors is stored as a leaf object comprising a serialized version of a fine proximity-based graph data structure; and
   a query service comprising a set of one or more processors configured to execute specific instructions, the query service configured to, in response to receiving a vector query:
      load a plurality of subsets of the set of vectors from the distributed object storage service based on the distributed hierarchical proximity-based graph data structure;
      determine, based on evaluation of similarities between a query vector and at least a portion of vectors in the distributed hierarchical proximity-based graph data structure, a plurality of objects to be obtained from the distributed object storage service; and
      load a plurality of subsets of vectors from the distributed object storage service by loading the plurality of objects from the distributed object storage service at least partially in parallel, wherein a first object of the plurality of objects is obtained from a first subset of storage devices of the distributed object storage service and a second object of the plurality of objects is obtained from a second subset of storage devices of the distributed object storage service.

2. The vector management system of claim 1, wherein index service is further configured to:
 cluster the set of vectors into the plurality of subsets of vectors based on evaluation of similarities between vectors of the set of vectors; and
 generate the different fine proximity-based graph data structures for each subset of the plurality of subsets of vectors.

3. The vector management system of claim 1, wherein the index service is further configured to:
 determine a common traversal path through the distributed hierarchical proximity-based graph data structure based on processing of a plurality of vector queries; and
 generate a storage object comprising vectors in the common traversal path.

4. The vector management system of claim 3, wherein the index service is further configured to:
 determine a second common traversal path through the distributed hierarchical proximity-based graph data structure based on processing of the plurality of vector queries; and
 generate a second storage object comprising vectors in the common traversal path, wherein the second storage object is stored on a different object subset of storage devices of the distributed object storage service than the storage object.

5. A computer-implemented method comprising:
 under control of a computing system comprising a computer-readable memory and a processor configured to execute specific instructions:
  clustering a set of vectors into subsets of the set of vectors based on evaluation of similarities between vectors of the set of vectors;
  generating based on the clustering of the set of vectors, a different bottom-level proximity-based graph data structure for each subset of the subsets of the set of vectors;
  generating an index of the set of vectors as a distributed proximity-based graph data structure using the different bottom-level proximity-based graph data structures and a top-level proximity-based graph data structure, wherein the distributed proximity-based graph data structure comprises representative vectors corresponding to subsets of the set of vectors, and wherein the top-level proximity-based graph data structure links the different bottom-level proximity-based graph data structures to form a distributed hierarchical proximity-based graph data structure;
  storing the set of vectors across a plurality of storage devices of a distributed storage system based on the distributed proximity-based graph data structure; and
  in response to receiving a vector query, loading different subsets of the subsets of the set of vectors from different storage devices of the distributed storage system at least partially in parallel based on the distributed proximity-based graph data structure.

6. The computer-implemented method of claim 5, further comprising selecting a first representative vector for a first subset of the set of vectors based on a distance of the first representative vector from a centroid or a vector of the first subset of the set of vectors.

7. The computer-implemented method of claim 5, further comprising generating a first representative vector for a first subset of the set of vectors as one of a centroid or a vector of the first subset of the set of vectors.

8. The computer-implemented method of claim 5, wherein evaluation of similarities of between vectors comprises determining one of: a cosine similarity, or a Euclidian distance.

9. The computer-implemented method of claim 5, further comprising:
 determining a common traversal path through the distributed proximity-based graph data structure based on processing of a plurality of vector queries; and
 generating a storage object comprising vectors in the common traversal path.

10. The computer-implemented method of claim 9, further comprising:
 determining a second common traversal path through the distributed proximity-based graph data structure based on processing of the plurality of vector queries; and
 generating a second storage object comprising vectors in the common traversal path, wherein the second storage object is stored on a different subset of storage devices of the distributed storage system than the storage object.

11. The computer-implemented method of claim 5, further comprising:
 determining, based on evaluation of similarities between a query vector and at least a portion of the representative vectors in the distributed proximity-based graph data structure, a plurality of objects to be obtained from the distributed storage system,
 wherein loading the plurality of subsets of the set of vectors from the distributed storage system comprises loading the plurality of objects from the distributed storage system at least partly in parallel, and
 wherein a first object of the plurality of objects is obtained from a first subset of storage devices of a plurality of storage devices of the distributed storage system and a second object of the plurality of objects is obtained from a second subset of storage devices of the plurality of storage devices of the distributed storage system.

12. The computer-implemented method of claim 11, further comprising:
 deserializing the first object to obtain a portion of the distributed proximity-based graph data structure; and
 evaluating similarities between the query vector and one or more vectors in the portion of the distributed proximity-based graph data structure.

13. The computer-implemented method of claim 5, further comprising:
 determining that a vector is to be deleted from the set of vectors, wherein the vector is stored as part of a first version of an object in the distributed storage system; and
 generating a second version of the object in the distributed storage system in which the vector is marked for deletion.

14. A system comprising:
 computer-readable memory storing executable instructions; and
 one or more computing devices programmed by the executable instructions to at least:
  cluster a set of vectors into subsets of the set of vectors based on evaluation of similarities between vectors of the set of vectors;

generate, based on the clustering of the set of vectors, a different bottom-level proximity-based graph data structure for each subset of the subsets of the set of vectors;

generate an index of the set of vectors as a distributed proximity-based graph data structure using the different bottom-level proximity-based graph data structures and a top-level proximity-based graph data structure, wherein the distributed proximity-based graph data structure comprises representative vectors corresponding to the subsets of the set of vectors, and wherein the top-level proximity-based graph data structure links the different bottom-level proximity-based graph data structures to form a distributed hierarchical proximity-based graph data structure;

store the set of vectors across a plurality of storage devices of a distributed storage system based on the distributed proximity-based graph data structure; and in response to receiving a vector query, load different subsets of the subsets of the set of vectors from different storage devices of the distributed storage system at least partially in parallel based on the distributed proximity-based graph data structure.

15. The system of claim 14, wherein the one or more computing devices are further programmed the executable instructions to:

determine a common traversal path through the distributed proximity-based graph data structure based on processing of a plurality of vector queries;

generate a storage object comprising vectors in the common traversal path;

determine a second common traversal path through the distributed proximity-based graph data structure based on processing of the plurality of vector queries; and generate a second storage object comprising vectors in the common traversal path, wherein the second storage object is stored on a different subset of storage devices of the distributed storage system than the storage object.

16. The system of claim 14, wherein the one or more computing devices are further programmed the executable instructions to:

determine, based on evaluation of similarities between a query vector and at least a portion of the representative vectors in the distributed proximity-based graph data structure, a plurality of objects to be obtained from the distributed storage system,
wherein loading the plurality of subsets of the set of vectors from the distributed storage system comprises loading the plurality of objects from the distributed storage system at least partly in parallel, and
wherein a first object of the plurality of objects is obtained from a first subset of storage devices of a plurality of storage devices of the distributed storage system and a second object of the plurality of objects is obtained from a second subset of storage devices of the plurality of storage devices of the distributed storage system;

deserialize the first object to obtain a portion of the distributed proximity-based graph data structure; and evaluate similarities between the query vector and one or more vectors in the portion of the distributed proximity-based graph data structure.

* * * * *

UNITED STATES PATENT AND TRADEMARK OFFICE
CERTIFICATE OF CORRECTION

| | |
|---|---|
| PATENT NO. | : 12,393,634 B1 |
| APPLICATION NO. | : 18/759330 |
| DATED | : August 19, 2025 |
| INVENTOR(S) | : Hakan Ferhatosmanoglu et al. |

It is certified that error appears in the above-identified patent and that said Letters Patent is hereby corrected as shown below:

In the Specification

In Column 9, Line 42, delete "other exterme, if" and insert --other extreme, if--.

In Column 9, Line 46, delete "data. Intermeidate degrees" and insert --data. Intermediate degrees--.

In Column 9, Lines 46-47, delete "quantization, porportional to" and insert --quantization, proportional to--.

Signed and Sealed this
Seventh Day of October, 2025

John A. Squires
*Director of the United States Patent and Trademark Office*